Jan. 16, 1951   G. SIEVERS   2,538,388
CROSS-WIND LANDING GEAR FOR AIRPLANES
Filed Aug. 2, 1949   2 Sheets—Sheet 2
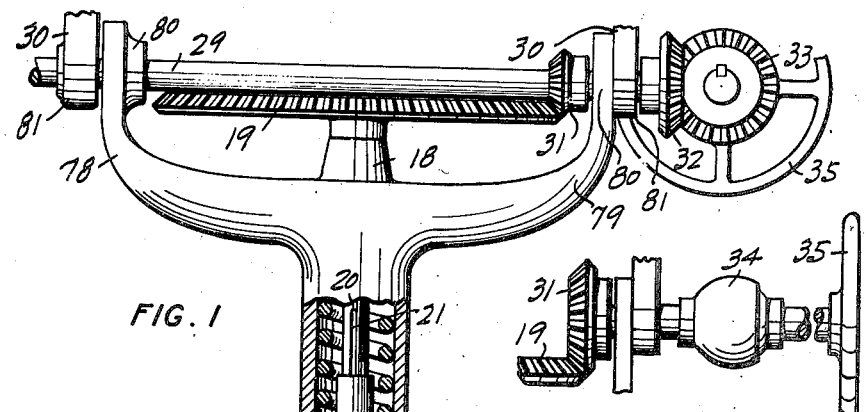
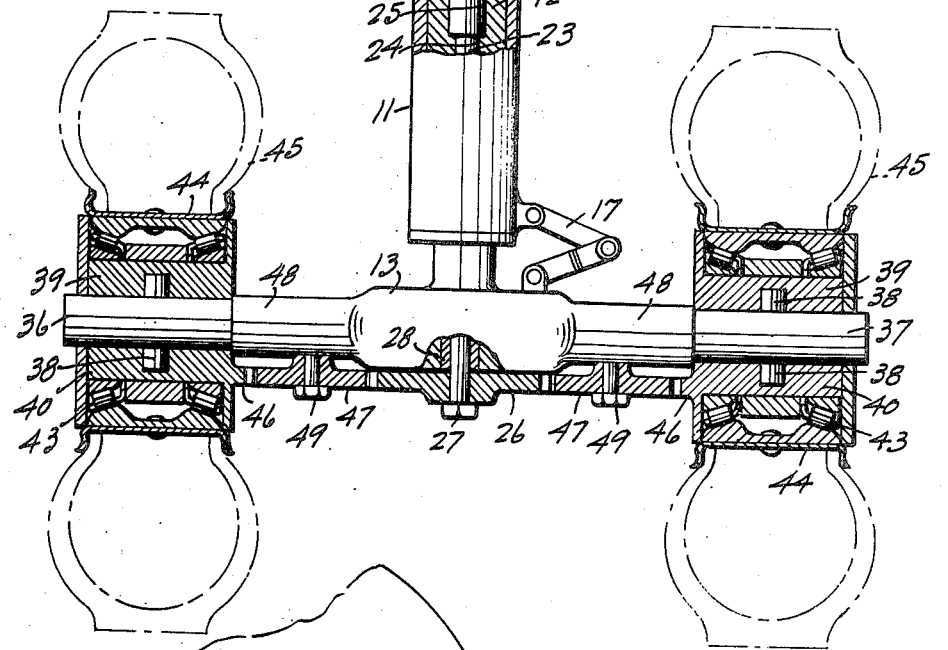
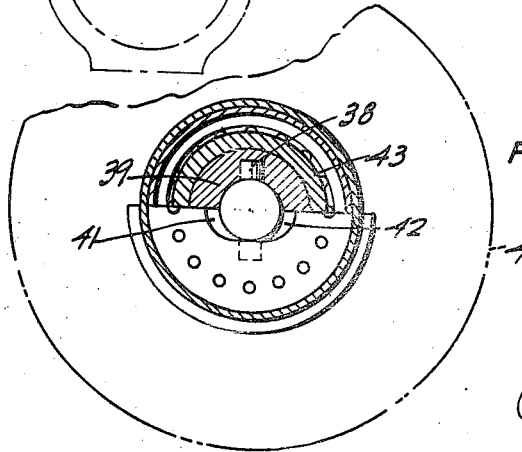
INVENTOR
George Sievers
BY
Philip A. Friedell
ATTORNEY.

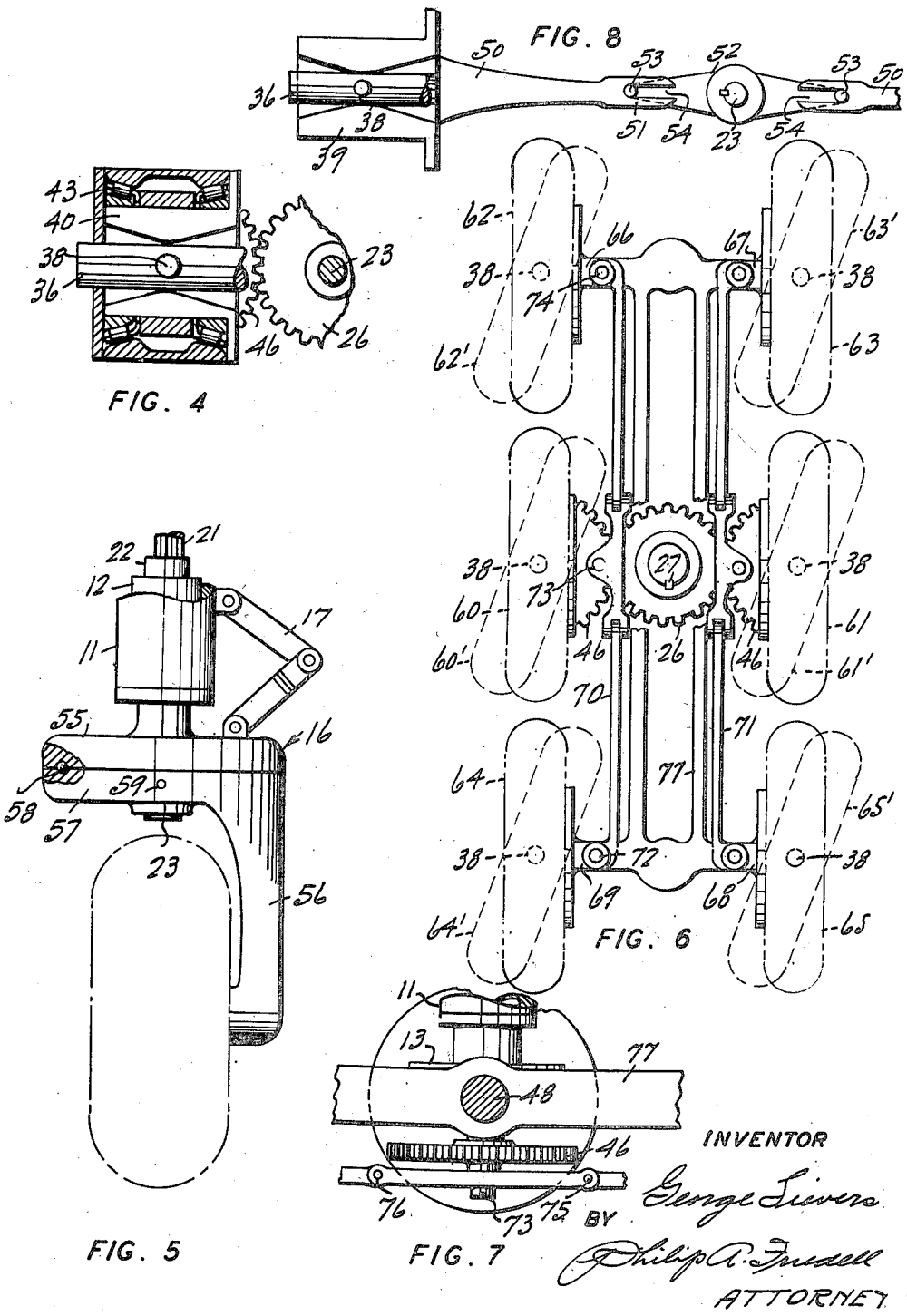

Patented Jan. 16, 1951

2,538,388

UNITED STATES PATENT OFFICE 2,538,388

CROSS-WIND LANDING GEAR FOR AIRPLANES

George Sievers, Oakland, Calif.

Application August 2, 1949, Serial No. 108,145

6 Claims. (Cl. 244—50)

This invention relates to improvements in landing gears for airplanes and provides a landing gear which can be headed along a landing strip while the airplane noses into a diagonal head wind, thus making it possible to follow along the landing strip during landing and simultaneously resist lateral wind pressure, increasing safety during landing because the airplane can be maintained on the landing strip while resisting the cross wind.

This invention can be applied to single, parallel, or tandem wheels and does not interfere with normal retraction and projection of the landing gear, and thus is suitable for all types of landing gears with the possible exception of endless tread types solely in view of practical considerations.

It is known that cross wind landing gears have been patented but all such landing gears are not positively steered, or the steering apparatus is complicated, and usually includes apparatus mounted externally of the shock absorbing struts, and in certain instances would not be adaptable to both, longitudinal and lateral retraction of the landing gear. Furthermore, when additional apparatus is mounted exteriorly of the strut, the wind resistance is increased at a point where the tendency is to cause the airplane to nose over.

My new cross wind landing gear is adaptable to either, longitudinal or lateral retraction, has no elements externally of the shock absorbing strut so that the streamlining of the strut is not affected. It is extremely simple in construction and operation and has but few moving parts.

The objects and advantages of the invention are as follows:

First, to provide a cross-wind landing gear with positive steering means and which is adaptable to either longitudinal or lateral retraction of the landing gear.

Second, to provide a landing gear as outlined which is provided with positive steering means which includes no elements externally of the shock absorbing struts, to maintain normal wind resistance of the strut.

Third, to provide a landing gear as outlined in which the steering shaft operates axially within the shock absorbing strut.

Fourth, to provide a landing gear as outlined which is adaptable to single, parallel, or tandem wheels, to steer all wheels positively and to an equal degree.

Fifth, to provide a landing gear as outlined which is of the utmost simplicity in construction, requiring the absolute minimum of additional space, and having an absolute minimum of parts, economical to construct and simple to operate.

In describing the invention reference will be had to the accompanying drawings, in which:

Fig. 1 is an elevation of the invention with parts in section to show the internal structures, and as applied to a longitudinally retractile landing gear.

Fig. 2 is a fragmentary view showing a modification of the manual control means.

Fig. 3 is a section taken on line 3—3 of Fig. 1.

Fig. 4 is a section taken on line 4—4 of Fig. 1 showing the axle solid.

Fig. 5 shows the invention applied to a single wheel landing gear.

Fig. 6 shows the invention applied to three pairs of wheels in tandem and is a bottom plan view of the carriage and operating mechanism.

Fig. 7 is a fragmentary view showing the hinged mounting of the multi-wheel carriage on the axles.

Fig. 8 shows a lever arrangement for operating the angle bushings.

Shock absorbing struts 10 are well known in the art and are of varied constructions, and therefore no specific type is illustrated, the invention being adaptable to any type of rigid strut or any type of shock absorbing strut which includes a cylinder 11 and a piston 12 which piston is integral with or fixed to the axle head 13 or a pivot head 16 for yokes and the like, the axle head or pivot head being retained against rotation relative to the cylinder 11 by suitable linkage 17, all of which parts are old in the art and therefore are believed to require no detailed description.

The invention consists in providing a hub 18 at the upper end of the strut for a gear 19 to rest on, and fixing the gear 19 on the upper end of a shaft 20 which is splined at its lower end as indicated at 21 with this splined end slidable in the broached and enlarged end 22 of a shaft 23. The shaft 23 is rotatable in a bore 24 formed axially through the piston 12, with the enlarged end rotatable in the counterbore 25 and seated in the bottom of the counterbore for support of the landing wheel structure by the piston, the shaft extending through the axle head 13 and having a gear 26 fixed thereon as indicated at 27, with the adjoining portion of the shaft rotatable in a bearing 28.

The conventional pivot shaft 29 for supporting the upper end of the strut for retraction and projection of the landing gear and the conventional hanger elements 30 are conventional in form and operation. A pinion 31 is mounted on this shaft 29, inside of one bearing 80, to mesh with the gear 19, and another pinion 32 is mounted on this shaft 29, outside of the hanger bearing 30 and which is driven by a meshing gear 33, or a universal joint 34 may be substituted for the gears 32 and 33 for operation substantially in line with the shaft 29; the steering mechanism being controlled through suitable means such as a steering wheel 35. Obviously, for lateral retraction and projection the axle head would be retained at right angles to the position shown in Fig. 1, the substitution of the universal joint and the 90 degree adjustment of the axle head being all that would be required for changing from longitudinal to lateral retraction and projection of the landing gear.

For two wheels in parallel as illustrated in Fig. 1, an axle, respectively 36 and 37 projects from the respective ends of the axle head and is preferably formed integral therewith, and each axle has a vertical pivot 38 located in spaced relation to the end of the axle.

Mounted on each axle are two halves 39 and 40 of an angle bearing which fits the axle vertically but has clearance on both sides as indicated at 41 and 42 to permit the bearing to oscillate about the vertical pivots 38, and suitable anti-friction bearings 43 are mounted on this angle bearing and simultaneously function to hold the two halves of the angle bearing together, and suitable tire rims 44 are mounted on the anti-friction bearings to carry the tires 45.

A sector gear 46 is formed on the inside face of the lower half of the angle bearing, and for short coupling between the wheels, this sector gear meshes directly with the gear 26 as indicated in Fig. 6, and for greater spans between the wheels, an intermeidate gear 47 may be interposed, being pivoted on the intervening portion 48 of the axle as indicated at 49 in Fig. 1.

As illustrated in Fig. 8, the gears 26, 46 and 47 can be replaced by a lever system, with one lever 50 projecting inwardly from the pivot or angle bearing 39 with the inner end 51 operatively connected to a lever 52 fixed on the lower end of the shaft 23, and being particularly desirable because there would be no gear teeth to clog by weeds or mud where forced landings were necessary, the coupling consisting as shown of a pin 53 in one element operating in a slot 54 formed in the other element of the cooperative levers.

For single wheels, the head 55 is formed integral with the piston 12, with the axle arm 56 having a thrust head 57 which rotates on the head 55 with intervening anti-friction bearings 58, the thrust head being fixed on the lower end of the shaft 23 as indicated at 59, and the head 55 being retained against rotation relative to the cylinder 11 by the conventional knee action lever system 17.

For single series tandem wheels, or for pairs of wheels in tandem as illustrated in Fig. 6, which shows an underside view, the gear 26 adjusts the two wheels 60 and 61 in the conventional manner described previously. The other wheels 62, 63, 64 and 65 are simultaneously operated through the medium of the sector gears 46 through levers 66, 67, 68 and 69 which project inwardly from the respective angle bearings, the levers 66 and 69 and 67 and 68, respectively being connected through connecting rods 70 and 71 with the sector gears as indicated at 72, 73, and 74; the connecting rods being hinged on horizontal axes at the points 75 and 76. The vehicular frame 77 is intermediately pivoted on the axles 48, being formed to straddle the axle head 13.

As will be noted, the strut is suspended on integral arms 78 and 79 by the shaft 29 which in turn is supported by the hangers 39; the shaft being rotatable in the bearings 80 of the arms and in the bearings 81 of the hangers 26.

By operating the steering wheel 35, the pinion 31 rotates the gear 19, which, being fixed on the upper end of the shaft 20 which through the spline 21 drives the lower shaft 22, rotating the gear 26 or the lever 52, thereby swinging the angle bearing 39 about its pivot 38 on the axle 36, permitting the pilot to align the wheels with the landing strip while nosing the airplane into a diagonal or cross wind.

With a series of wheels in tandem, the auxilliary wheels 62, 63, 64 and 65 being mounted on the carriage 77 which carriage in turn is pivoted on the main axle, will follow the contour of the landing strip and will be guided in the same direction as, and with the main wheels 60 and 61 as indicated at 60', 61', 62', 63', 64' and 65'.

I claim:

1. A cross wind landing gear for an airplane comprising; a strut for the landing gear and having an adjusting shaft passing axially therethrough; a frame pivoted centrally of its length on a transverse axis to the lower end of said strut; a plurality of axles fixed to said frame and having each a vertical pivot; a bushing for each axle and centrally pivoted on said vertical pivot and having clearance formed therein for angular movement on said axle about said pivot; a vehicle wheel rotatably mounted on each bushing; operative connections between the lower end of said adjusting shaft and said bushings for angularly moving said bushing relative to said axles and about said pivots; and operating means for the upper end of said adjusting shaft for rotatably adjusting said adjusting shaft in either direction at will.

2. A structure as defined in claim 1; said strut comprising a shock absorbing strut having a piston terminating at its lower end in a head, and said frame being pivotally supported intermediate its length by said head, and said adjusting shaft passing through said strut and said piston and including a telescopic connection to compensate for axial movements of the piston.

3. A cross wind landing gear for an aircraft comprising; a shock absorbing strut having a piston; an adjusting shaft passing axially through said shock absorbing strut and said piston and including a telescopic intermediate joint, and having a first operative connection at its upper end and a second operative connection at its lower end; said piston terminating at its lower end in an axle head; a frame pivotally supported on a transverse axis by said axle head, and a plurality of pairs of axles fixed to the respective ends of said frame; a vertical pivot on each axle; a vehicle wheel mounted for rotation on each axle with intervening bushing and for angular movement relative to the axle; operative connections from each of said bushings to said second operative connection for angular adjustment of all of said bushings and the wheels carried thereby in the same direction and to the same degree for aligning said wheels with a landing strip while the aircraft is headed into a crosswind.

4. A structure as defined in claim 3; said frame comprising a carriage oscillatably mounted on and spanning said axle head and having axles centrally and at each end projecting in opposition, and said operative connections including articulated connections between the three bushings on each side of the carriage for simultaneous adjustment of all of the wheels and to permit limited oscillation of the carriage with respect to the second operative connection on the axle head.

5. A structure as defined in claim 3; said operative connections from each of said bushings to said second operative connection comprising connecting rods intermediately hinged on horizontal axis to permit limited oscillating movement of the carriage and the wheels at the respective ends of the carriage.

6. A crosswind landing gear for an aircraft comprising; a strut having a cylinder and a piston and a head formed at the lower end of said piston; an adjusting shaft passing axially through said cylinder and piston and means for rotating said shaft at will; a frame spanning said head and intermediately pivoted thereto on a transverse axis; opposed axles at the front, center and rear of said frame and bushings interiorly pivoted on a vertical axis on said axles, and having clearance for angular movement thereon, and a wheel rotatably mounted on each bushing, and operative connections from said adjusting shaft to the respective bushings for angularly adjusting all bushings and the wheels carried thereby in the same direction and to the same degree.

GEORGE SIEVERS.

REFERENCES CITED

The following references are of record in the file of this patent:

UNITED STATES PATENTS

| Number | Name | Date |
|---|---|---|
| 684,733 | Warren | Oct. 15, 1901 |
| 784,042 | Fowler | Mar. 7, 1905 |
| 923,210 | Strawn | June 1, 1909 |
| 942,151 | Tindal | Dec. 7, 1909 |
| 2,222,850 | Maclaren | Nov. 26, 1940 |
| 2,396,318 | DeBell | Mar. 12, 1946 |

FOREIGN PATENTS

| Number | Country | Date |
|---|---|---|
| 509,574 | Great Britain | July 18, 1939 |